Nov. 28, 1961     H. E. DANIELS     3,010,410
POWER TRACK CONVEYOR
Filed Nov. 20, 1958     5 Sheets-Sheet 1
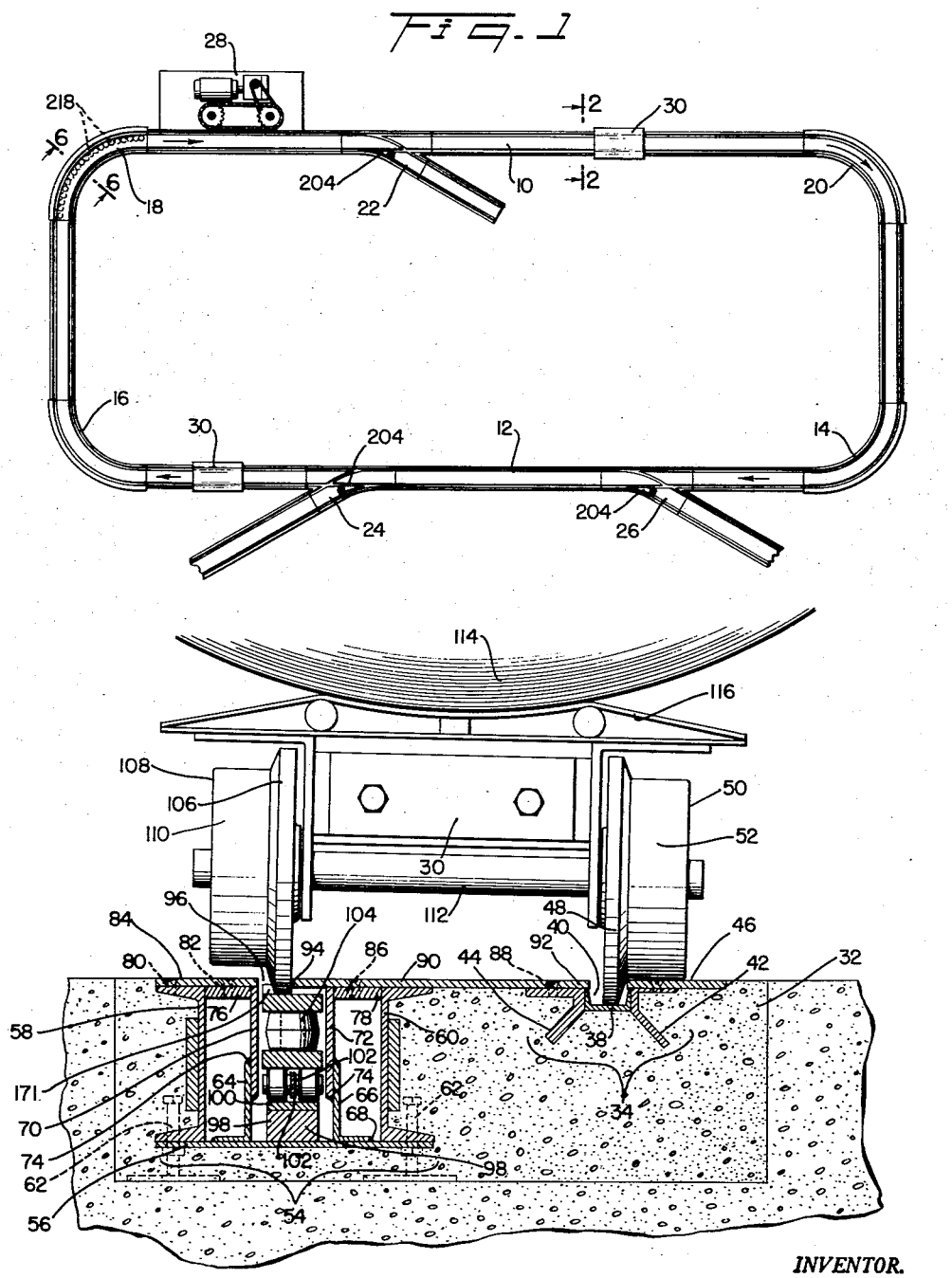
INVENTOR.
HERBERT E. DANIELS
BY Robert E. Isner
ATTORNEY Nov. 28, 1961     H. E. DANIELS     3,010,410

POWER TRACK CONVEYOR

Filed Nov. 20, 1958     5 Sheets-Sheet 2

INVENTOR.
HERBERT E. DANIELS
BY
Robert E. Isner
ATTORNEY

Nov. 28, 1961  H. E. DANIELS  3,010,410
POWER TRACK CONVEYOR
Filed Nov. 20, 1958  5 Sheets-Sheet 3

INVENTOR.
HERBERT E. DANIELS
BY Robert E. Isner
ATTORNEY

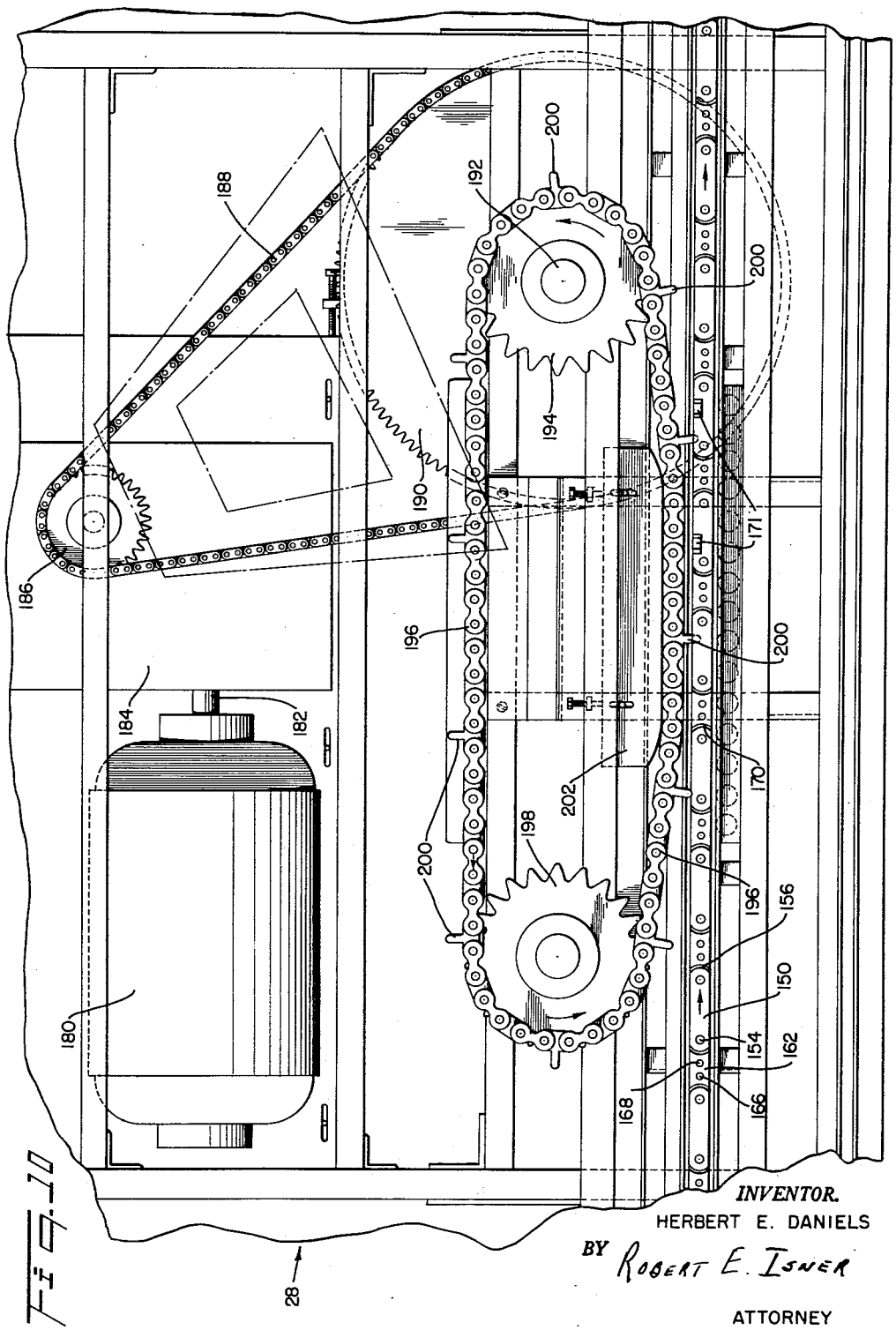

Nov. 28, 1961   H. E. DANIELS   3,010,410
POWER TRACK CONVEYOR
Filed Nov. 20, 1958   5 Sheets-Sheet 5
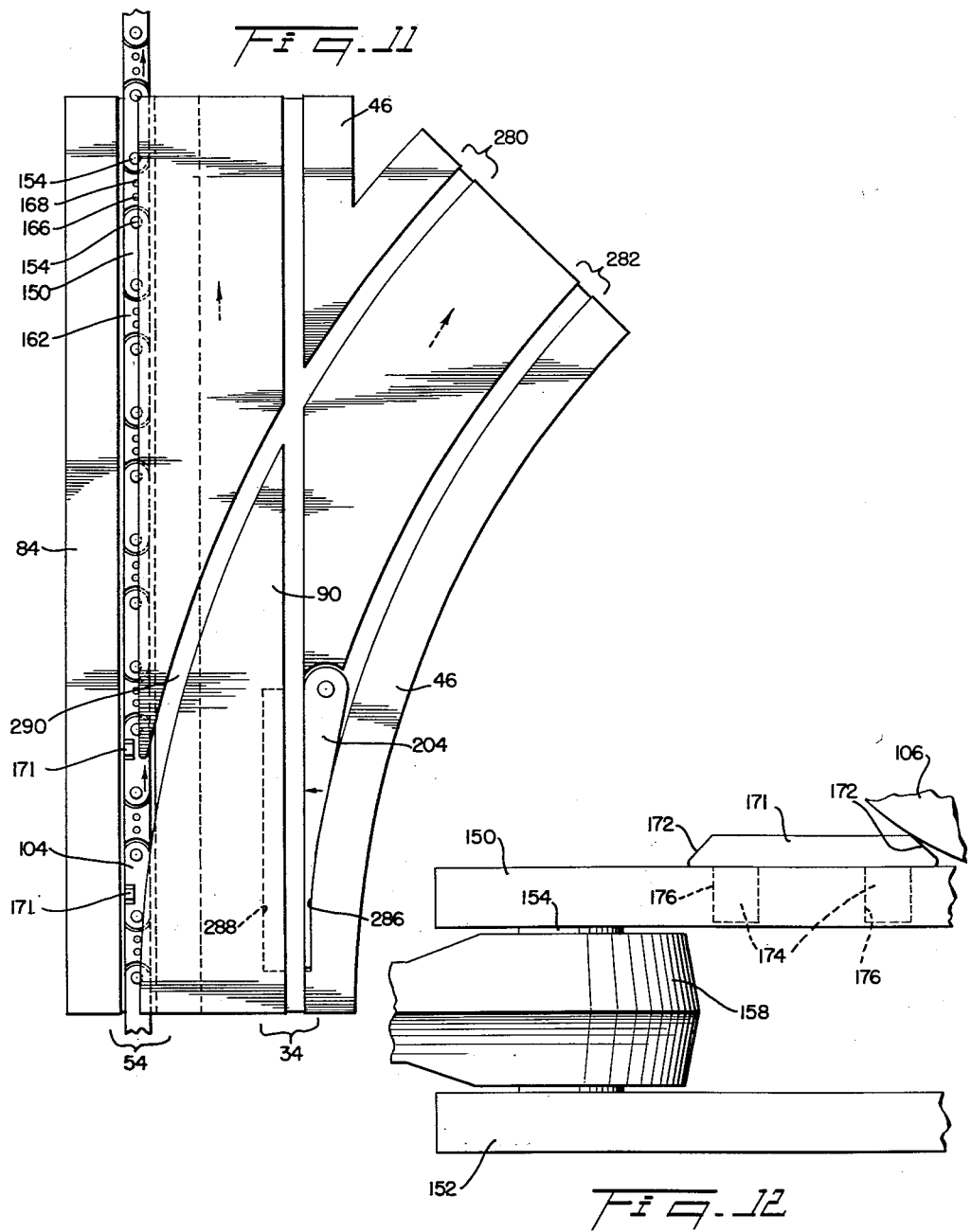
INVENTOR.
HERBERT E. DANIELS
BY Robert E. Isner
ATTORNEY … # 3,010,410
POWER TRACK CONVEYOR
Herbert E. Daniels, Orange, N.J., assignor to The Jampol Company, Inc., Brooklyn, N.Y., a corporation of New York
Filed Nov. 20, 1958, Ser. No. 775,202
9 Claims. (Cl. 104—137)

This invention relates to track type conveying systems and particularly to an improved construction for a power driven track type conveyor.

Power driven track type conveyors are of general utility in the transport of relatively heavy material from one predetermined location to another in many diverse manufacturing and assembly operations. One field of particular utility for such systems is newspaper press rooms wherein it is necessary to provide for a planned flow of relatively heavy rolls of paper stock to a plurality of printing presses and it is to this field of particular utility that the herein disclosed embodiment of the invention is particularly directed. It will be apparent, however, to those skilled in the art that the herein disclosed power driven track type conveyor would be of utility in many widely varying types of installation.

This invention may be briefly described as an improved construction for power driven track type conveyors wherein transport of articles on wheeled dollys is effected by selective engagement with a continuously driven chain member moving in a predetermined path and wherein said continuously driven chain member is supported over its entire path of travel by a rolling chain member serving as an anti-friction bearing therefor.

Among the advantages attendant the practice of the herein described invention is an economy of operation occasioned by greatly reduced power requirements and minimization of maintenance, the permitted utilization of the disclosed conveyor in widely varying track patterns and an inherent flexibility of operation resulting from a permitted counter-current flow of material.

The object of this invention is the provision of an improved construction for power driven track type conveyors.

Other objects and advantages of the invention will be pointed out in the following disclosure and claims and illustrated in the accompanying drawings which show the principles of the invention and the presently preferred embodiment of a power driven news print conveyor for newspaper press rooms which incorporates said principles.

Referring to the drawings:

FIG. 1 is a schematic plan view of a closed circuit conveyor system incorporating the principles of this invention and illustrative of a simplified layout or track pattern thereof;

FIG. 2 is an enlarged sectional view as taken on the line 2—2 of FIG. 1;

FIG. 10 is a plan view of a suitable drive mechanism for the disclosed conveyor system;

FIG. 11 is a plan view, on an enlarged scale, showing the essential structure of a switch mechanism; and, FIG. 12 is a side elevation, on an enlarged scale, showing the mounting of a driving cleat on the drive chain.

Figure 4:
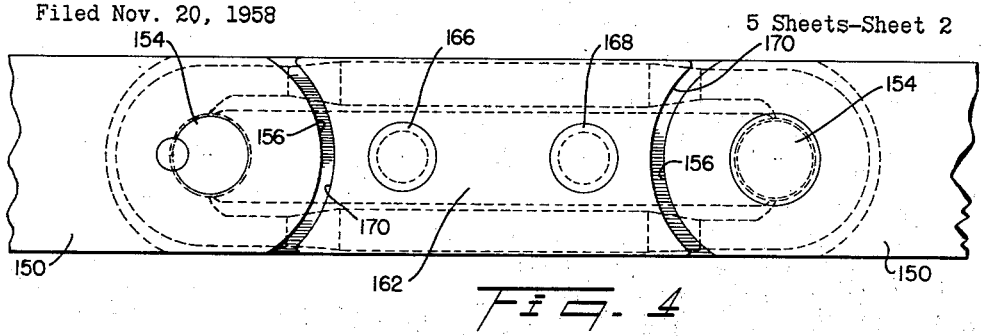
FIG. 4 is a sectional view as taken on the line 4—4 of FIG. 3.

Referring to the drawings and particularly to FIG. 1 thereof, there is shown a power driven track type conveying system incorporating the principles of this invention. The illustrated system is in the form of a generally rectangularly shaped closed circuit having elongate straight away portions 10, 12, right angle curved portions 14, 16, 18 and 20, a right hand switch 22, a left hand switch 24, an entry switch 26, a drive assembly 28 and a wheeled conveying dolly 30 disposed on the straight away portion 10. It should be understood that the illustrated rectangular layout is one of the more simple layouts and that the invention may be incorporated in more complicated track layouts which include any combination of straight and curved track segments almost without limit as to length and incorporating any number of switch members, including double switches wherever the same are needed.

FIGS. 2 through 5 illustrate certain of the constructional details of the improved power driven conveyor mechanism. Referring to these drawings, the conveying system is adapted to be permanently installed at or near floor level, as for example in a specially prepared concrete base 32 in the floor of a building. Referring particularly to FIG. 2, there is provided a fixed track assembly generally designated 34, formed by an embedded upwardly open U-shaped member 38 defining, in part, a flange receiving recess 40, adjacent anchoring members 42, 44 and a weight bearing plate member 46 having its upper surface disposed at floor level and serving as a track. The flange receiving recess 40, formed in part by the member 38, is positioned to receive the flange portion 48 of a freely rotatable conveyor dolly wheel 50 when the weight bearing surface 52 thereof is disposed on the upper surface of the plate 46. The flange receiving recess 40 is preferably of a depth such that the periphery of the flange 48 is not disposed in weight supporting engagement with the upwardly directed surface of said U-shaped member 38. The above described structure for the fixed track assembly 34 is employed for both the straight and curved portions of the conveyor track system.

The moving or power track assembly 54, for a straight portion of track, is formed of a fixed section which includes a horizontally disposed base plate 56, a pair of spaced flanged beam members 58, 60 having their outwardly directed lower flanged portions secured to said plate 56, as at 62, a pair of angle irons 64, 66 disposed in spaced relation with each other and with the beam members 58 and 60 and welded to the base plate 56 as at 68 and a pair of plate members 70, 72 welded to the upwardly directed portions of the angle irons, as at 74, having their upper ends disposed in spaced relation with the upper portion of the beam members 58 and 60 by horizontally disposed spacing members 76 and 78. Disposed flush with the floor surface and secured to the upper flange of the beam member 58, as at 80, and to the spacing member 76, as at 82, is a track defining plate member 84. Also disposed flush with the floor surface and secured to the spacing member 78, as at 86, and to the anchoring member 44 of the fixed track assembly 34, as at 88, is an intermediate plate member 90. The intermediate plate member 90 is sized, as illustrated in FIG. 2, so that its end 92 defines, in part, the flange receiving recess 40 and so that its other end 94 is disposed in predetermined spaced relation with the adjacent end of the plate member 84 to define a flange receiving recess 96 disposed therebetween.

Mounted on the base plate 56 intermediate the angle irons 64 and 66 is a continuous spacing block 98 having a stationary race member 100 secured to its upper surface. Positioned to ride on the upper surface of the race member 100 is a rolling chain assembly, generally designated 102, which in turn supports a drive chain assembly generally designated 104. The upper surface of the drive chain assembly 104 is elevationally disposed, relative to the track plate 84, so as to support the flange 106 of a freely rotatable conveyor dolly wheel 108 in such manner as to prevent the wheel surface 110 from being disposed in weight supporting relationship on the upper surface of said track plate 84. As FIG. 2 clearly shows, the arrangement of the fixed track assembly 34 and the moving track assembly 54 provides that the surface 52 of the wheel 50 of the dolly 30 is always disposed in rolling engagement with the track plate 46 and that the flange 106 of dolly wheel 108 is disposed in either rolling or stationary engagement with the upper surface of the drive chain assembly 104. In accordance therewith, it is necessary that each of the dolly wheels 50 and 108 be freely and independently rotatable on the axle 112 and that such wheel mounting be of a character to maintain its freely rotatable characteristics under heavy loadings, as for example, the weight of a roll of news print 114 mounted in a suitably shaped cradle 116 on the upper surface of the dolly.

Figure 3:
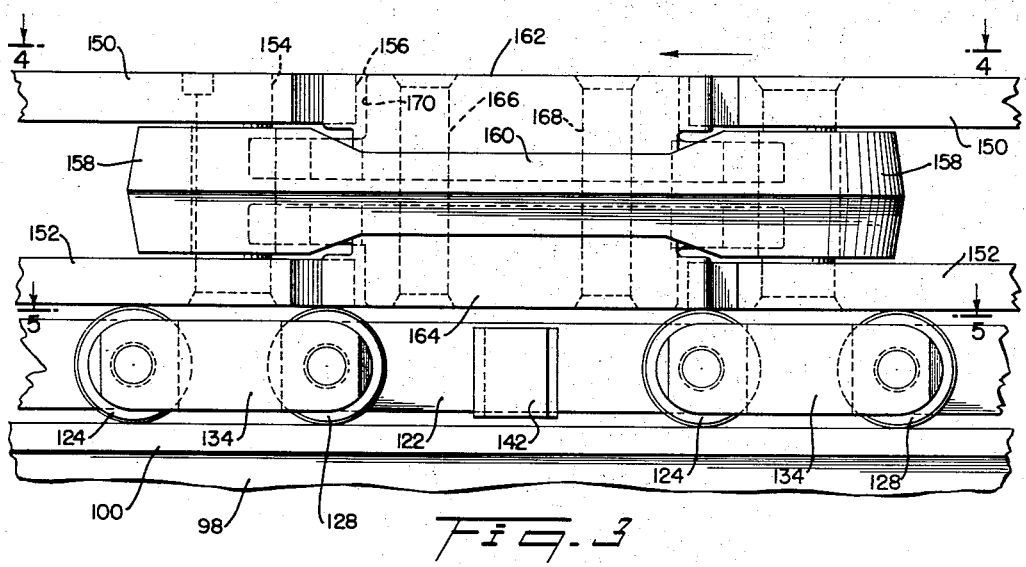
FIG. 3 is a side elevational view, on an enlarged scale, of a portion of the drive chain and rolling chain mechanism.
Figure 5:
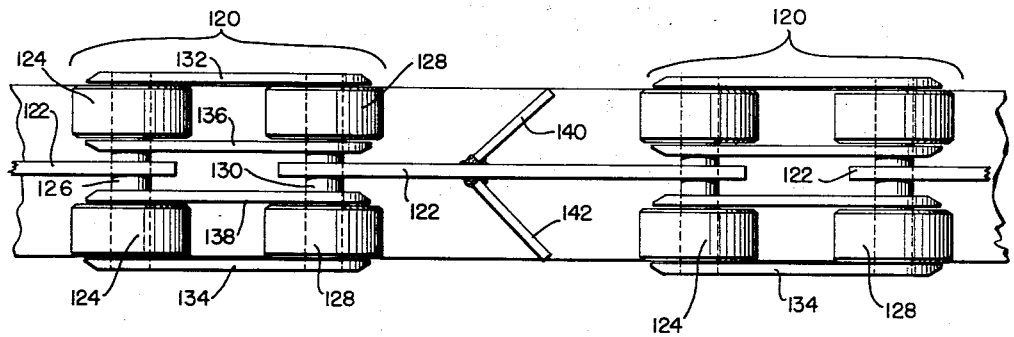
FIG. 5 is a sectional view as taken on the line 5—5 of FIG. 3.

FIGS. 3 and 5 illustrate the presently preferred constructional details of the roller chain assembly, hereinbefore designated 102. As there illustrated there is provided a rolling chain formed of a plurality of roller links, generally designated 120, disposed in spaced connected relation by the connecting bars or plates 122. Each of the roller links 120 is formed of a first pair of vertically disposed cylindrically shaped rollers 124 rotatably mounted on a horizontally disposed axle member 126 and a second pair of vertically disposed cylindrically shaped rollers 128 rotatably mounted on a horizontally disposed axle member 130. The axles 126 and 130 are terminally mounted in side link plates 132 and 134. The end portions of the axle are preferably mounted in floating relation in said link plates having the axle receiving apertures suitably plugged to provide a continuous and smooth outer surface. Disposed intermediate each pair of rollers are floating spacer plates 136, 138 and the connecting bars 122 are secured in floating relation to the axles intermediate said spacing plates 136 and 138. Angularly disposed scrapers 140, 142 are preferably included at regular intervals in an assembled chain on the connecting bars 122 to render the rolling chain assembly 102 generally self cleaning. The scrapers 140, 142 are sized and mounted so as to scrape dirt and sludge from the sides of the confining channel of the moving track assembly 54 and direct the same into a location from which it may periodically be removed.

The above described construction for the rolling chain assembly readily permits the same to follow a curved path, as for example, the illustrated right angle corners 14, 16, 18 and 20 as shown in FIG. 1. The floating mounting of the axles 126, 130 in the side link plates 132 and 134 together with the plugged outer surfaces thereof, permits the roller links to move sideways within the limits of the confining guides, i.e. the elements 70 and 72 in FIG. 2, as such they can spread as necessary on the curves to permit the connecting bars 122 to take an angular position relative to the axles 126, 130 in accordance with the degree of the turn. It will be apparent to those skilled in the art that the axle engaging holes in the connecting bars 122 should be made sufficiently over size to permit this necessary angular displacement.

FIGS. 3 and 4 illustrate the constructional details of the presently preferred embodiment of the drive chain assembly 104. As there illustrated there is provided a series of links disposed in spaced apart relationship, each formed of horizontally disposed upper and lower spaced link members 150, 152 respectively, in the form of flat plate like units. At each end of each of said link members 150, 152 is a vertically disposed pin member 154 positioned in substantially concentric relation with the arcuately shaped end portion 156 of said link members. The link members 150, 152 are maintained in vertically spaced apart relation by the interposed end portion 158 of a horizontally disposed connecting link 160 encircling the pin 154 in freely rotatable relationship, the connecting links 160 also serving to connect successive links in horizontally spaced apart relation. As shown in the drawings the center section of the connecting links 160 is of reduced vertical extent. In order to maintain planar substantially continuous upper and lower surfaces for the drive chain assembly 104 connecting link fillers 162 and 164 are mounted on both sides of said connecting link center section as by the pins 166 and 168. As best shown in FIG. 4, the end portions of the fillers 162 and 164 are provided with an arcuately shaped recess 170 disposed closely adjacent to and concentric with the curved end portions 156 of the hereinbefore described link members 150 and 152. The fillers 162, 164 in cooperation with the link members 150, 152 provide essentially continuous planar upper and lower surfaces for the drive chain assembly 104 independent of the angular relationship between the links and connecting links to each other, the lower surface thereof being disposed in engagement with the roller links 120 and serving as a moving race and the upper surface thereof serving as a dolly wheel flange supporting surface.

Selectively included at any desired predetermined intervals on the upper surface of the drive chain assembly 104 and positioned to engage the flange 106 of the dolly wheel 108 disposed in engagement therewith are cleat members 171 (see FIGS. 2 and 12). As best shown in FIG. 12 the cleat members 171 are relatively small in size and are provided with inclined beveled end portions 172. Preferably the flange engaging cleats 171 are made selectively locatable and to this end they are provided with dependent pins 174 sized to be insertable into spaced apertures 176 included in the surface of the upper link members 150.

FIG. 10 illustrates the essentials of a suitable drive mechanism for effecting the continuous advance of the drive chain assembly 104. As there illustrated, there is provided an electric motor 180 having its drive shaft 182 connected to a suitable gear reducer 184. The output sprocket 186 of the gear reducer 184 is connected, as by intermediate drive chain 188, to a sprocket wheel 190 mounted on a shaft 192. The shaft 192, driven by the sprocket 190, in turn drives a sprocket 194. The sprocket 194 in turn drives an endless master drive chain 196 supported at its other end by an idler sprocket 198. The master drive chain 196 is provided with a plurality of extending driving lugs 200 adapted to be disposed in intermeshed driving engagement with the drive chain assembly 104 by a pressure plate 202. As is apparent, rotation of the motor 180 is transmitted into continuous displacement of the master drive chain 196 which in turn is transmitted into continuous displacement and advance of the drive chain assembly 104 about a predetermined closed path.

By suitable sizing and shaping of the cleats 171, engagement thereof with the flange 106 of the dolly wheel 108 will result in advance of the loaded dolly 30 in accordance with the advance of the continuously moving drive chain assembly 104 with the dolly wheel 108 not rotating and the dolly wheel 50 rotating on the track plate 46 and yet will additionally permit the dolly 30 to ride over the cleats 171 if dolly movement in the direction of advance of the moving drive chain assembly 104 is externally impeded. Thus the above construction permits selective advance of the dollys in accordance with the moving drive chain assembly 104, cessation of dolly advance relative to the advancing drive chain assembly 104 upon application of external restraint thereto and additionally permits a counter current flow of the dolly 30 and material carried thereby by manual displacement of the dollys against the direction of advance of the drive chain assembly. In the latter instance the wheel 108 will rotate on the upper surface of the heretofore described moving drive chain assembly 104 without any undue resistance thereto save for the presence of the cleat members 171.

The above permitted selective dolly displacement results in a great degree of operational flexibility. In a newspaper press room such permitted selective dolly displacement permits the dollys to be pushed on or off the main track at switch locations without cessation of conveyor movement and independent of cleat location. In addition thereto the permitted displacement of loaded or unloaded dollys over the aforementioned cleats and in a direction opposite to that of the direction of advance of the moving drive chain assembly 104 makes it possible to move material counter current where necessary to do so as for example, in a newspaper press room when it is necessary to align a particular roll 114 of paper stock with an unloading position or when a particular roll is needed at a press up stream from the location of said roll on the conveyor system.

The selective positioning of the cleats 171 on the surface of the moving drive chain assembly 104 additionally permits the entire system to be used as a moving storage supply during operations, for example, during press runs in a press room a number of varying sized rolls can be continuously circling the press area during the operation. Thus when a new roll is needed the press man may selectively remove a roll of the proper size from the system without having to go to another part of the room to secure the same.

The removable cleats 171 also make it possible to use the system as an ordinary industrial track either by choice or in emergency conditions when there has been a power failure or other equipment failure that would necessitate shut-down of the drive mechanism.

The use of the heretofore described rolling chain assembly 102 and drive chain assembly 104 makes it possible to selectively drive the drive chain 104. The roller chain assembly is then driven by the frictional engagement of the driven top chain and permits the latter to roll upon the lower chain with a consequent reduction in required power and a consequent reduction in wear upon said drive chain assembly. In addition to the above, and since each roller link 120 in the roller chain assembly 102 is driven by contact with the drive chain assembly 104 the driving power for the roller chain is spread evenly throughout said chain rather than originating at one point as would be the case if the bottom chain were separately driven. It will be apparent, therefore, that the connecting links 122 in the roller chain assembly 102 need be no stronger than that required to maintain the proper spacing between the roller links 120. Thus it will be seen that the internal stresses on the roller chain assembly are, as a practical matter, independent of length and as such permits the roller chain assembly to be increased to any desired length without any appreciable effect upon the power requirements for the system.

Another advantage attendant the above described construction is a reduction in wear occasioned by the fact that the roller chain assembly advances at half the speed of that of the drive chain assembly. Such speed differential results in the drive chain assembly 104 making two revolutions around the closed circuit for each one revolution of the roller chain assembly. By this speed differential the wear on both the top and bottom chains is distributed evenly on the length thereof and practically results in appreciable increases in the useful life of both of said chain assemblies.

Figure 6:
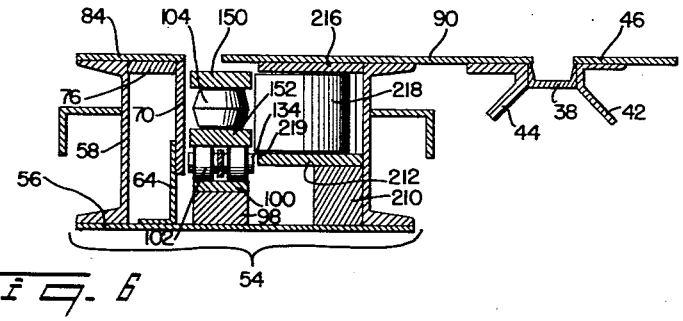
FIG. 6 is a sectional view as taken on the line 6—6 of FIG. 1.

FIG. 6 illustrates the essentials of the presently preferred constructional details for the curved portion of the conveyor track. As there shown, it will be seen that the fixed track section 34 is the same as that heretofore described in detail in conjunction with a straight track section. In contra-distinction therewith the moving or power track section 54 is modified to provide a rolling bearing surface for the inside portion of the drive chain assembly 104 as it traverses the curve. Specifically, there is provided a horizontally disposed mounting plate 212 supported by a spacer block 210 at a height to permit the outwardly directed end thereof 214 to be disposed in abutting guiding relationship with the side link plates 134 of the roller chain assembly 102. A second horizontally disposed mounting plate 216 is positioned adjacent the under side of the plate 90. Disposed intermediate the mounting plates are a plurality of closely spaced, freely rotatable cylinders 218 sized to have the periphery thereof disposed in abutting relationship with the side portion of the links 150 and 152 and thereby provide a rolling or anti-friction guide therefor as said links traverse the curve.

Figure 7:
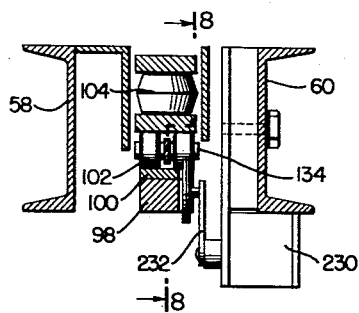
FIG. 7 is a vertical sectional view of a presently preferred safety switch mechanism includable in the disclosed power driven track type conveyor system.
Figure 8:
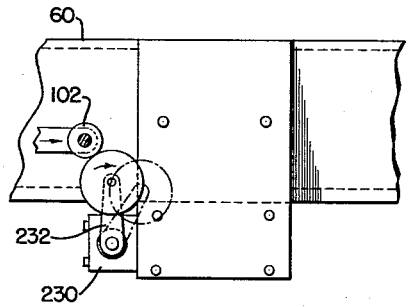
FIG. 8 is a sectional view as taken on the line 8—8 of FIG. 7.
Figure 9:
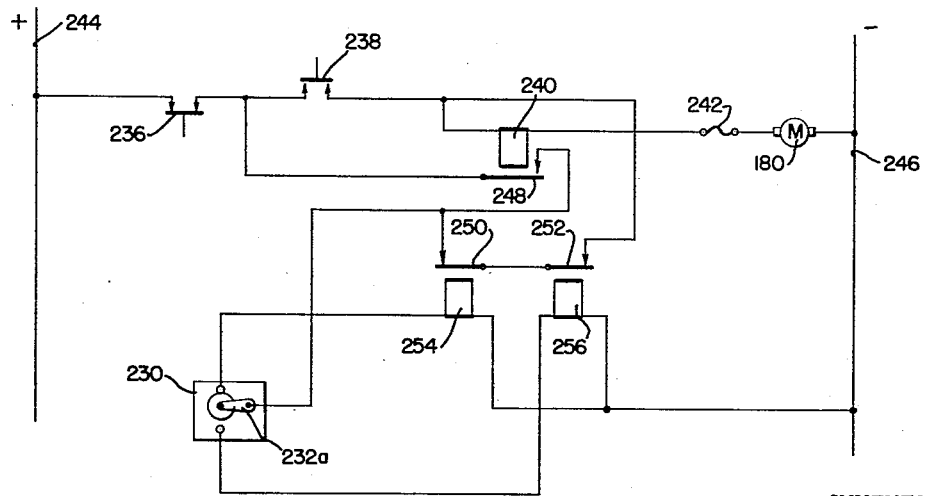
FIG. 9 is a schematic circuit diagram of a presently preferred safety control circuit.

FIGS. 7 through 9 illustrate the constructional details of a presently preferred safety control unit includable in a power track conveyor system incorporating the principles of this invention. As illustrated there is provided a micro switch 230 having an actuating arm 232 normally biased, as by a suitable spring mechanism, in the rest position wherein said actuating arm 232 is substantially vertically disposed. The actuating arm 232 is adapted to be successively displaced from said rest position by engagement by the roller links 120 of the roller chain assembly 102 and to be displaced thereby from the rest position to the displaced position as illustrated in dotted lines in FIG. 8. FIG. 9 shows the associated electrical control circuit which includes a normally closed stop switch 236, a manually closable normally open start switch 238, a holding coil 240, a safety fuse 242 and the drive motor 180 disposed in series across the power supply lines 244 and 246. The starting switch 238 is paralleled by a series circuit including the contacts 248 for the holding coil 240 and the normally closed contacts 250, 252 for the hereinafter described first and second pneumatic timing relays schematically designated 254 and 256 respectively. The normally closed contacts 250 and 252 are in turn paralleled by a control subcircuit which includes the micro switch 230 with its movable arm 232a, actuated by said actuating arm 232, selectively connectable either to the coil for the pneumatic timing relay 254 or the pneumatic timing relay 256, dependent upon the position of said actuating arm in its rest or displaced positions.

In operation of the above described circuit momentary depression of the start switch 238 results in current flow through the holding coil 240 and closure of the holding coil contacts 248. The closure of the holding coil contacts completes a by-pass circuit from power line 244 through the normally closed stop switch 236, said holding coil contacts 248, the normally closed contacts 250 and 252, the holding coil 240, the safety fuse 242 and the drive motor 180 to line 246 with consequent energization of said drive motor and advance of the moving drive chain assembly 104 and roller chain assembly 102. The displacement of the roller chain assembly 102 will result in repeated and periodic displacement of the micro switch actuating arm 232 from its rest position to its displaced position and return and in a flow of current alternately through the coils for the pneumatic timing relays 254 and 256 in accordance with the disposition of the micro switch movable arm 232a. The pneumatic timing relays are commercial items of a character such that the associated normally closed contacts will open after a predetermined interval of current flow through the coils therefor. Suitable units include model RG-9E pneumatic timing relays as manufactured by the Square D Manufacturing Company. In the above described circuit, it will be seen that as long as the roller chain assembly 102 is moving the continual displacement of the actuating arm 232 intermediate its rest and displaced positions results in a selective alternation of current flow through the coils 254 and 256. As long as the period of current flow through either of these coils does not exceed the above mentioned predetermined time interval for the pneumatic timing relays the normally closed contacts 250 and 252 will remain closed and the drive motor 180 will be continuously activated. If, for any reason, the movement of the roller chain assembly 102 is halted, the above described displacement of the micro switch actuating arm 232 will cease with the contact 232a thereof being connected in circuit with either the coil 254 or the coil 256 of the pneumatic timing relays. After the passage of the above mentioned predetermined time interval of current flow through either the coil 254 or 256 the associated contact will be automatically opened with a resultant opening of the power circuit for the motor 180 and consequent cessation of advance of the drive chain assembly 104. By the above described control system any stoppage in advance of the roller chain assembly, with its consequent loss of anti-friction properties, results in an automatic stoppage of advance of the drive chain assembly 104. Such automatic stoppage immediately prevents any over strain in said drive chain assembly and possible damage thereto occasioned by the loss of the anti-friction properties inherent in the roller chain assembly 102.

FIG. 11 shows the essential structure of a switch mechanism for effecting the removal of dollys from the power track or, if desired, for the permitted introduction of dollys onto the power track. As there illustrated, there is provided a straight track section having the moving drive chain assembly 104 disposed in the moving or power track assembly 54 and intermediate track plates 84 and 90 as described above. There is also provided the fixed track assembly 34 as defined by the track plates 46 and 90. The take-off track is formed of two fixed track sections 280 and 282 of a construction essentially similar to that of the fixed track section 34. The track section 282 is positioned to merge with the track section 34 and the track section 280 is positioned to merge with the moving track assembly 54 on said straightaway. Included at the junction point of the track section 34 and the track section 282 is a pivotally operated switch dog or lever 204 manually displaceable from the recess 286 for straight away operation into the recess 288 for switching a dolly onto the take-off track. In operation of the described switch, displacement of the switch dog 204 into the recess 288 will result in engagement of the flange 48 on an advancing dolly wheel 50 and the direction of said wheel into the take-off track 282. Such displacement of a dolly wheel 50 will also result in the flange 106 on the wheel 108 being disengaged from the moving chain assembly 104 and directed into track 280. For smooth operations the base portion 290 of the track section 280 should be disposed coplanar with the upper surface of the moving track assembly 104. If desired, the track sections 280 and 282 can be made to merge with standard industrial track to permit manual displacement of the dollys over an existing track system.

It should be noted that the above described construction for a power track conveyor assembly includes no take-up unit to accommodate slack in the moving or drive chain assembly 104. The use of a take-up is avoided by constructing the drive chain assembly 104 in such manner as to provide about 3/16" play in each of the chain connections therein, resulting in about 3/8" play per linear foot thereof. When the drive chain assembly 104 is installed it is made up to the nearest foot of chain length required to complete the circuit. If, for example, the drive chain 104 is then actually 3" longer than required, this 3" of slack is taken up by the play in the joints in such way as to obviate the need of a take-up. Under these conditions the drive chain 104 is pulled from immediately behind the drive mechanism and pushed immediately in front thereof. The length of chain that has to be pushed is thus determined by the amount of overall slack present. With 3/8" slack per linear foot available and 12" of maximum slack that would have to be pushed it is thus never necessary to push more than 32' of chain at any time. If more slack develops during use all that is necessary to overcome the same is removal of 1' of drive chain from the circuit. The thus permitted avoidance of the use of a take-up circuit appreciably simplifies the cost of manufacture and installation thereof which additionally minimizes the maintenance costs attendant use of the unit.

Having thus described my invention I claim:

1. A closed circuit power track conveyor for displacement of transport vehicles having independently rotatable flanged wheels comprising a fixed track section providing rolling contact wheel guide and support and a planar surfaced moving track section disposed in uniform spaced relation with said fixed track section selectively providing stationary contact wheel support in the direction of track advance and rolling contact wheel support in a direction countercurrent to that of track advance.

2. A closed circuit power track conveyor for displacement of transport vehicles having independently rotatable flanged wheels comprising a fixed track section providing rolling contact wheel guide and support, a stationary race disposed parallel to said fixed track section, a planar surfaced driven track disposed in spaced relation to said stationary race selectively providing stationary contact wheel support in the direction of track advance and rolling contact wheel support in a direction counter current to that of track advance and horizontally articulated anti-friction bearing means disposed intermediate said stationary race and said moving track and displaceable relative to said stationary race in response to displacement of said driven track for providing substantially continuous rolling contact support for the latter over its total length.

3. The conveyor as set forth in claim 2 wherein said anti-friction bearing means comprises a roller chain.

4. The conveyor as set forth in claim 2 wherein said moving track comprises a driven chain.

5. The conveyor as set forth in claim 2 including wheel engaging cleat members removably mounted on the upper surface of said moving track to engage said vehicle wheels and effect advance thereof in accordance with advance of said moving track.

6. The conveyor as set forth in claim 5 wherein said wheel engaging cleat members are shaped to permit wheel displacement thereover in response to application of external restraint to vehicle advance.

7. An improved track construction for power track type conveyors comprising a stationary race, confining guide means disposed on either side of said race and in spaced relation therewith, a driven track disposed in spaced relation to said stationary race and within said guide means and horizontally articulated anti-friction bearing means disposed intermediate said stationary race and driven track and displaceable relative to said stationary race in response to displacement of said driven track for providing substantially continuous rolling contact support for the latter over its total length.

8. The track construction as set forth in claim 7 wherein said anti-friction bearing means comprises a roller chain displaceable in conjunction with said driven track and at half the speed thereof.

9. The track construction as set forth in claim 7 wherein said driven track comprises a planar surfaced driven chain.

References Cited in the file of this patent

UNITED STATES PATENTS

| | | |
|---|---|---|
| 1,355,460 | Forbes | Oct. 12, 1920 |
| 1,407,673 | Roe | Feb. 21, 1922 |
| 1,827,886 | Geillespie | Oct. 20, 1931 |
| 2,075,918 | Waalkes | Apr. 6, 1937 |
| 2,100,253 | Irwin et al. | Nov. 23, 1937 |
| 2,117,790 | Cowles | May 17, 1938 |
| 2,572,011 | Cohen et al. | Oct. 23, 1951 |
| 2,685,361 | Garman et al. | Apr. 3, 1954 |
| 2,782,727 | King | Feb. 26, 1957 |